United States Patent

Vlahek

[11] Patent Number: 5,319,876
[45] Date of Patent: Jun. 14, 1994

[54] FISHING TACKLE

[76] Inventor: Josip Vlahek, 54 Gordon St., Tullamarine, Victoria 3043, Australia

[21] Appl. No.: 35,564

[22] Filed: Mar. 23, 1993

Related U.S. Application Data

[63] Continuation of Ser. No. 818,806, Jan. 9, 1992, abandoned.

[51] Int. Cl.$^5$ .................. A01K 91/00; A01K 83/00
[52] U.S. Cl. ................................................. 43/44.9
[58] Field of Search .............. 43/44.2, 44.4, 44.9, 43/43.4, 42.06, 42.41, 17.2

[56] References Cited

U.S. PATENT DOCUMENTS

| | | | |
|---|---|---|---|
| 2,014,517 | 9/1935 | Beregow | 43/44.9 X |
| 2,097,536 | 11/1937 | Shirk | 43/17.2 |
| 2,763,086 | 9/1956 | Johnson et al. | 43/44.2 |
| 2,892,283 | 6/1959 | Hudson | 43/44.9 X |
| 3,170,756 | 2/1965 | Butler | 43/43.4 |
| 3,631,624 | 1/1972 | Edde | 43/42.41 |
| 3,908,298 | 9/1975 | Strader | 43/42.41 |
| 4,217,721 | 8/1980 | Hershberger | 43/43.2 |
| 4,610,104 | 9/1986 | Garcia | 43/44.9 |
| 4,890,411 | 1/1990 | Buccilli et al. | 43/42.06 |

FOREIGN PATENT DOCUMENTS 1429940 3/1087 United Kingdom ............... 43/42.41

Primary Examiner—Kurt C. Rowan
Attorney, Agent, or Firm—Edwin D. Schindler

[57] ABSTRACT

An article of fishing tackle comprising an open compartment, preferably in the form of a cone having an aperture through which a fishing line can pass and being adapted to be mounted on a fishing line above a hook, the density of the article being little different from water so that during casting and retrieval it moves to a position adjacent the hook to protect the bait on the hook and the hook but when the hook is in the water it moves away from the hook to enable fish to strike the hook.

8 Claims, 1 Drawing Sheet

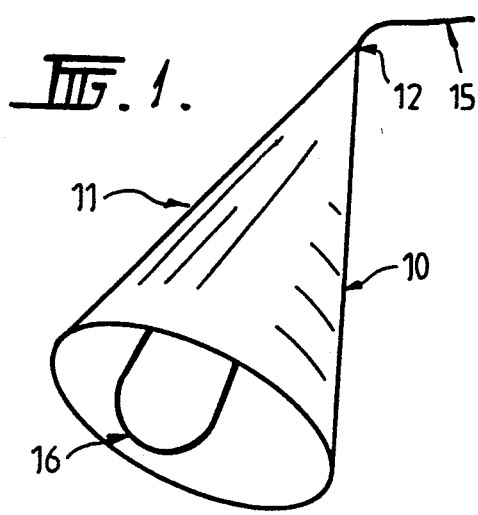
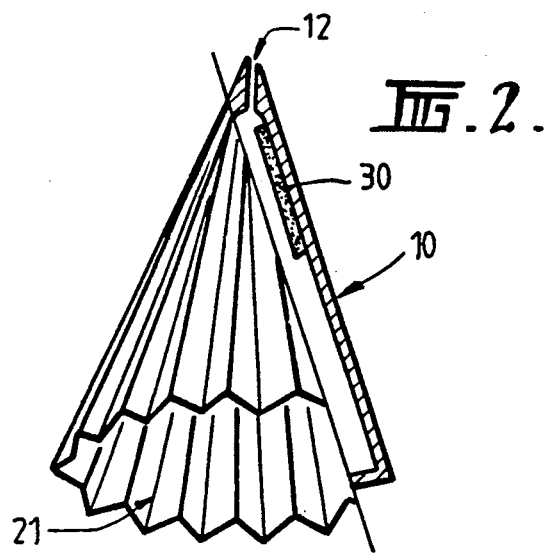
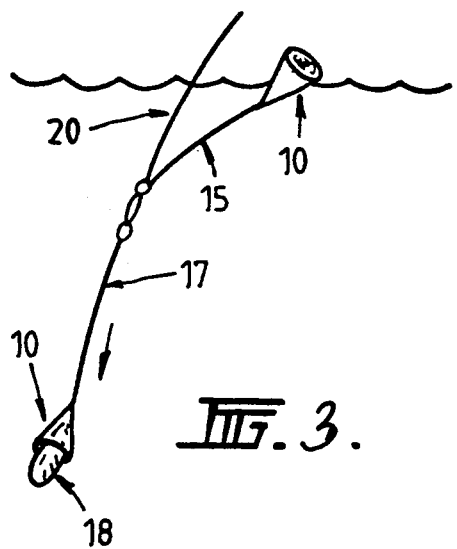
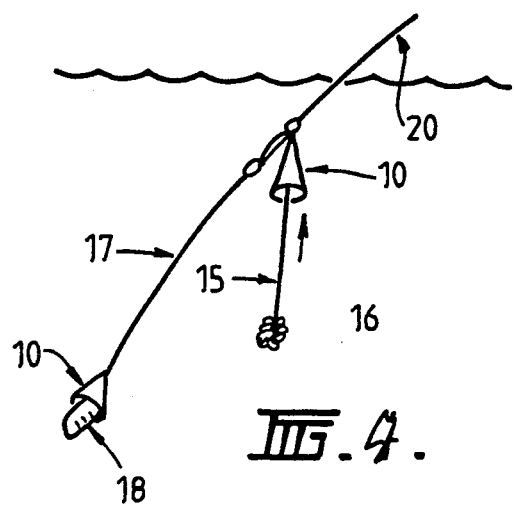
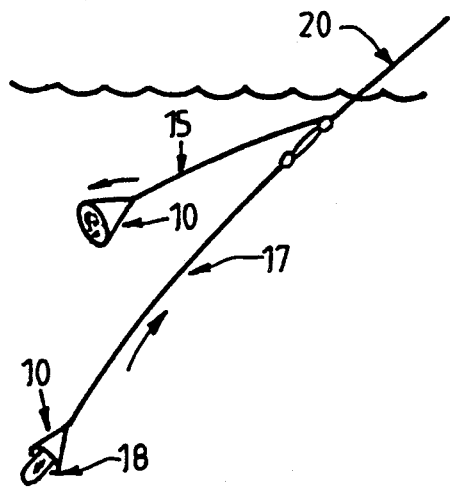
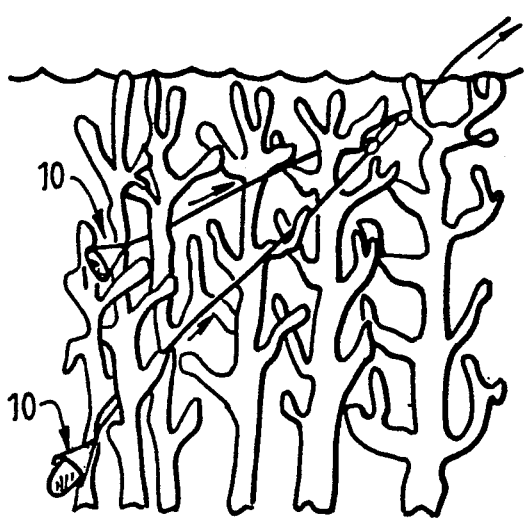

FISHING TACKLE

This application is a continuation of application Ser. No. 07/818,806, filed Jan. 9, 1992, now abandoned.

BACKGROUND OF THE INVENTION

This invention relates to fishing tackle and in particular to improvements in fishing tackle which can aid a fisherman when casting and can also be valuable in avoiding snagging of lines.

When casting, and particularly casting long distances either manually or by the use of a compressed air casting device, fisherman often have problems in ensuring that the bait remains on the hook, and this is particularly the case where bait which is inherently soft is used.

For this reason it may often be necessary to use a firm bait and, on occasions to tie the bait to the hook even though the particular form of bait may not be the most satisfactory for the purpose concerned and, where the bait is tied onto the hook, where the finished appearance of the bait is definitely unnatural.

Fishermen also have difficulties, particularly when fishing in areas where there are obstructions, such as a build up of seaweed in ocean fishing or snags or the like in river or lake fishing as, when they attempt to recover their lines, the hooks and/or the sinker can often be caught by the obstruction and on occasions the only way to recover the line is to deliberately effect the breakage of a trace or the line above the trace, where a particularly strong trace is being used, and thus recover the line without the hooks and/or sinkers attached thereto.

It is the object of the present invention to provide an article of fishing tackle which minimizes both of these problems.

SUMMARY OF THE INVENTION

The invention includes, in its broadest sense, an article of fishing tackle which comprises an open compartment closed at one end, an aperture in the closed end through which a fishing line or trace is adapted to pass, the article being adapted to be located on a fishing line above a hook with the open end directed towards the hook characterised in that the article, when out of the water will normally move into a position overlying the hook and when in water can move along the line away from the hook.

In one form the device of the invention can comprise a generally thin walled cone with the aperture through the apex of the cone, the cone being of such a size as to overlie a hook and any bait thereon or the inner end of a sinker.

BRIEF DESCRIPTION OF THE DRAWING FIGURES

In order that the invention may be more readily understood I shall describe in relation to the accompanying drawings certain embodiments of the invention.

In these drawings:

FIG. 1 is a side perspective view of the article of the invention;

FIG. 2 is a side elevational view partly broken away and showing of a second embodiment of the invention;

FIG. 3 shows the article of the invention when a line with which it is associated is entering the water;

FIG. 4 shows a somewhat similar view with the article having moved away from the hook;

FIG. 5 shows the position adopted by the device when the line is being recovered; and FIG. 6 shows the line being recovered through snags.

DETAILED DESCRIPTION OF THE PREFERRED EMBODIMENTS

In the form of the device illustrated in FIG. 1, the device 10 may comprise a thin walled cone 11 preferably made of a synthetic plastics material but which could be made of any other material having a density less than or not substantially greater than that of water.

The cone has, through its apex an aperture 12 slightly larger than the diameter of the fishing line or trace with which it is to be used and may be of various sizes.

In shown in the Figure, the device 10 is threaded onto the trace 15 to which the hook 16 is to be connected, above the hook, and the hook and the free end of the trace is connected to a line 20 as is well known in the fishing art.

The size of the device 10 is sufficient to overlie the hook when baited.

In a second application as illustrated in FIGS. 3 to 6 the device 10 of the invention is placed on the line or trace 17 above a sinker 18 and in this case the device is preferably of a size to overlie at least the adjacent end of the sinker. Preferably a knot is formed adjacent the apex to limit movement of the device.

Preferably the material from which the device 10 is made has, apart from the density property refered to above, a reasonable degree of flexibility. In order to obtain the desired properties, the device can be satisfactorily injection moulded.

When the line 20 to which the devices are connected is to be used the hook 16 is baited in the normal way with the most desirable bait for the circumstances and the device 10 is either slid or permitted to slide to overlie the hook and bait.

When the line is cast as illustrated in FIG. 3, either by hand or mechanically it will be appreciated that the hook 16 and associated bait is drawn along by the weight of the sinker 18 and will be oriented rearwardly relative to the line. The device 10 of the invention will be caused to retain its position where it overlies the hook and bait or, if it was not in that position when the cast is started will adopt this position. This means that the bait is basically protected against displacement from the hook in that it is effectively held in position by the device of the invention which overlies it.

When the sinker 18 hits the water, the trace carrying the hook and device will tend to follow behind the main line, as this would be its natural movement in any case and the device 10 of the invention provides a sea anchor type effect. Again it will be seen that during this movement the device effectively shields the bait from any action by the water as the hook and its attached bait is being drawn downwardly and, it will be appreciated, that in some applications this downward movement will be relatively fast as the sinker being used can be relatively heavy.

When the sinker 18 reaches the bottom or the movement of the line under the weight of the sinker otherwise ceases, then the baited hook on its trace will tend to drop relative to the line and at the same time because the device of the invention is lighter or of substantially the same weight as the water that it displaces, it will tend to move up the trace 15, thus exposing the hook 16 and the bait, and will normally continue to move until it stikes the junction between the trace and the line. This situation is shown in FIG. 4.

At this time it must be appreciated that, device is spaced from the hook and the bait and will have no effect on the action of the hook should it be taken by a fish. I believe that even when the device remains associated with the hook, fish can still take the bait.

At the same time the device can act as an attractive device to fish and it may be of any required outer finish. For example it could be simply made of a white or coloured plastics material or it could, if required, be chromed or otherwise finished so as to be readily visible underwater.

This could attract fish which would of course tend to be drawn towards the bait when they are attracted as the device would have no effective smell whereas the bait would have the appearance and smell of natural prey.

When the line is to be taken in, and there is no fish on the hook, then again the upward movement of the line itself will cause the trace 15 to tend to move relative to the device which will move to a position where it overlies the hook and any bait which may still be thereon. This is shown in FIG. 5.

This is particularly useful should there be anything on which the line can snag as, instead of there being a likelihood that the hook will snag, the hook is effectively encased within the device of the invention and because the device is effectively conically shaped this will tend to centralize in any restriction and will tend to be able to move there through. This is shown in FIG. 6.

If the constriction is narrower in width than the maximum diameter of the device, then if the device is made of a flexible material, as was mentioned earlier, then there will be a deformation of the device whilst it moves through the restricted space and, once it becomes free of the restriction it will tend to return to its initial shape.

We have not discussed the operation of a device of the invention in respect to the sinker and it will be appreciated that this is of little importance during casting and during normal fishing although, once again the device associated with the sinker would tend to move away from the sinker when the sinker reaches the bottom so I prefer to know the trace or line 17 to prevent this movement. The device can become useful in this circumstance is that, when the line is being withdrawn from the water, the device will provide a smooth tapered body which can be drawn through relatively narrow areas and which tends to prevent any snagging of the sinker.

In practice even attepts to deliberately snag lines using the device of the invention have been unsuccessful.

Whilst I have in the foregoing described one particular form of device it is to be understood that without departing form the spirit and scope of the invention other forms could be readily used.

For example the device as illustrated in FIG. 2 is formed with small ribs or vanes 21 on its outer surface which will tend to make it track more accurately when it is being effectively used as a sea anchor, as previously described.

Also should it be required the actual shape of the device could be similar to a shell of a shell fish and could thus look more natural when in the water than would a perfectly conical device.

The type of shell fish emululated could vary from such fish known as pipiwinkles which have an almost conical shell to a half mussel shell. The latter is probably not fully desirable as its aerodynamic property would be very much less satisfactory than those of the other types.

The device of FIG. 2 is shown as having a sponge 30 located about its internal periphery and I can place fish oil or some other attractor on the sponge.

It will be seen that the device of the invention whilst very simple provides great advantages to anglers both in the area which appears to be a greater concern, the maintenance of the bait on the hook until it enters the water but also in the ease of effecting the removal of lines from areas where they might otherwise be badly snagged.

I claim:

1. A fishing tackle, comprising:
   a fishing line;
   a hollow device having external ribs and an open compartment with an open end and a closed end, said fishing line being adapted to pass through an aperture in said closed end of said hollow device;
   a hook on said fishing line on the open end of said hollow device in which said hollow device is movable along said fishing line from a first position at which said hollow device overlies said hook to a second position in which said hook is extending therefrom, the first position being assumed when casting is being effected and when the line is moved through the water.

2. The fishing tackle according to claim 1, wherein said hollow device is conical in shape and the aperture is through the apex of the cone.

3. The fishing tackle according to claim 1, wherein said hollow device is made of a plastic material.

4. The fishing tackle according to claim 3, wherein said hollow device is flexible.

5. A fishing tackle, comprising:
   a fishing trace;
   a hollow device having external ribs and an open compartment with an open end and a closed end, said fishing trace being adapted to pass through an aperture in said closed end of said hollow device;
   a hook on said fishing trace on the open end of said hollow device in which said hollow device is movable along said fishing trace from a first position at which said hollow device overlies said hook to a second position in which said hook is extending therefrom.

6. The fishing tackle according to claim 5, wherein said hollow device is conical in shape and the aperture is through the apex of the cone.

7. The fishing tackle according to claim 5, wherein said hollow device is made of a plastic material.

8. The fishing tackle according to claim 7, wherein said hollow device is flexible.

* * * * *